[51.] JOHN H. MOONEY & GEORGE A. LLOYD.
Improvement in Animal Traps.
No. 119,237. Patented Sep. 26, 1871.
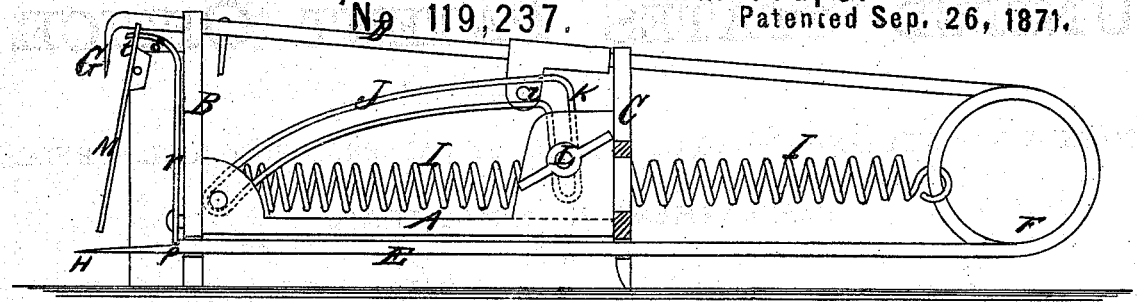
Fig. 2.
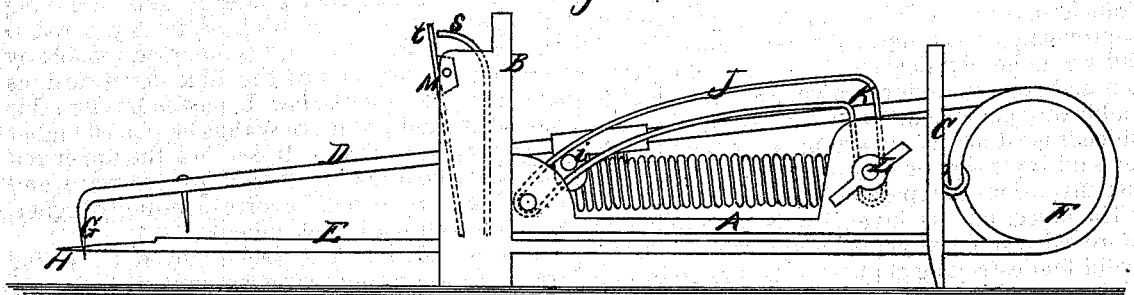
Fig. 3.
Fig. 4.
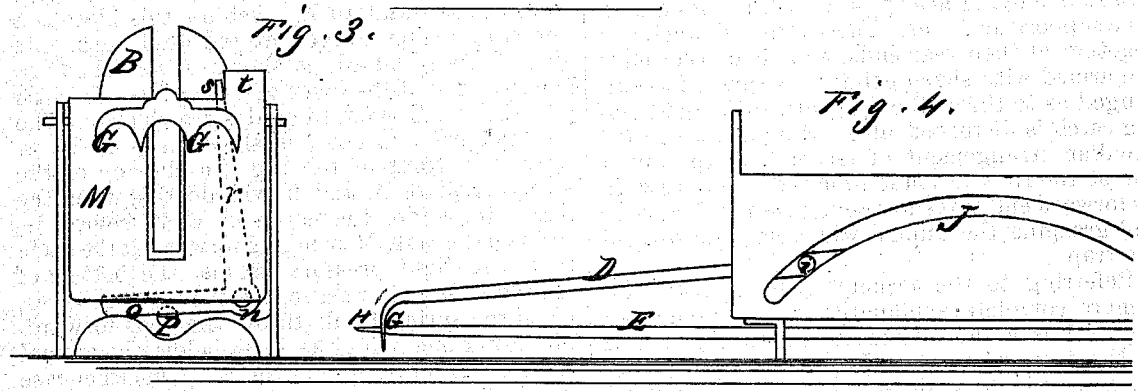
Fig. 5.
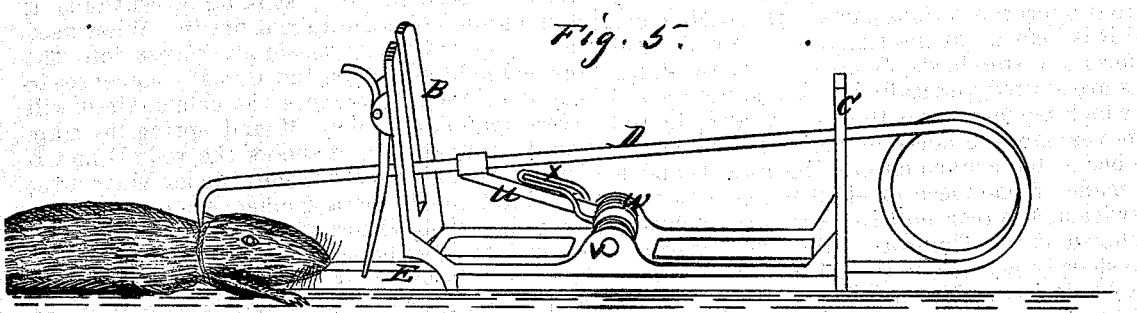
Witnesses
Geo. H. Strong
Benjn. C. Faber
Inventors
John H. Mooney
Geo. A. Lloyd
By their atty's
Dewey & Co.

UNITED STATES PATENT OFFICE.

JOHN H. MOONEY AND GEORGE A. LLOYD, OF SAN FRANCISCO, CALIFORNIA.

IMPROVEMENT IN ANIMAL-TRAPS.

Specification forming part of Letters Patent No. 119,237, dated September 26, 1871.

*To all whom it may concern:*

Be it known that we, JOHN H. MOONEY and GEORGE A. LLOYD, of city and county of San Francisco, State of California, have invented an Improvement in Gopher and other Animal-Traps; and we do hereby declare the following description and accompanying drawing are sufficient to enable any person skilled in the art or science to which it most nearly appertains to make and use our said invention or improvements without further invention or experiment.

The object of our invention is to provide an improved trap for animals; and it will be chiefly useful for destroying gophers, rats, squirrels, and other such vermin. Our invention consists of two rods moving nearly parallel through a suitable supporting frame. These rods are connected together at their rear ends, and their front ends are armed with sharp points. A spring is so arranged as to throw the rods forward if the holding-catch is disturbed after being set, and by a peculiar arrangement of mechanism the upper one of the rods is made to describe an arc with its forward end as it shoots out, thus reaching over and grasping the animal which has approached the trap.

Referring to the accompanying drawing for a more complete explanation of our invention, Figure 1 is a side elevation, showing one form of the trap when set. Fig. 2 shows the trap sprung. Fig. 3 is an end view. Figs. 4 and 5 are modifications of our device.

A is the bed of a stout frame, so constructed as to support the various parts of the mechanism, and it is bent up at the front and rear ends so as to form two standards, B and C. These standards are slotted vertically so as to guide the rod D, which moves above the bed A, and the rod E moves through holes in the standards below the bed A for convenience. The rods D and E are made of one piece of stout wire coiled once or twice at the rear end so as to form a spring, as shown at F. The front end of the lower rod E is sharply pointed at H, and barbed or not, as may be desired. The upper rod D has its front end bent down at right angles and has three or more sharp points or prongs, G, directly over the point H of the lower rod. A stout spring, I, is attached at one end to the coil F of the rods and its other end is secured to the bed A near the front, so that it tends to impel the rods forward if they are drawn back. In order to give the front end of the upper rod a motion in a curve we construct a slotted guide or link, J, having any desired curve, and a pin, *i*, from the rod D enters the slot. The trap is made adjustable by bending the rear end of the link downward, as shown at K. A set-screw, L, passes through this part of the link, which may thus be placed higher or lower, as desired. If set low the upper rod will describe a low curve as it goes forward, and if set high the arc will be correspondingly higher, so as to secure a larger animal.

Various devices may be employed to set the trap. In the present case we employ a swinging plate, M, which is hinged at its upper edge to the front of the standard B. Behind this plate is a bell-crank lever hinged at the angle near one side of the standard, as shown at *n*. The horizontal arm *o* of the lever will drop into the notch *p* in the rod E when the rod is drawn back. The vertical arm *r* is bent, as shown at *s*, so as to project in front of the lug *t* on the top of the swinging plate M, and it will do this when the arm *o* drops into the notch in E, as before described, the plate M swinging forward at the same time. A slight pressure against the bottom of the plate M will release the ends of the lever, when the spring I will throw the rods forward. The lower one will either pass below the animal or enter the lower part of the body, in either case making a firm support against the stroke of the upper rod, which is thrown out in a curve, as above described, and, striking downward, it pierces and holds the animal firmly. When used as a gopher-trap it is simply thrust into the opened hole, and when the animal commences to throw up the dirt to close the hole again it will press against the plate M and spring the trap. As the trap springs it shoots the rods D and E out far enough to secure the animal, which most traps fail to do, for a gopher, when its hole is opened, will stop short of the entrance and begin to push the dirt before it to close the hole again from the interior. This generally springs any trap, and as the gopher is not nearer than four or five inches he will escape. If employed as a rat or squirrel-trap it can easily be arranged so that a bait can be attached. Fig. 4 shows a slight variation in the device for producing the curve, the slot or link being formed in the sides of the supporting frame, and a pin, *i*, passing through the rod D, follows the slot. If found more convenient, the curving motion of the upper rod may be obtained by various other devices, one of which is shown at Fig. 5. In this case the upper rod D is pinned to the end of a lever-arm, $u$, which moves about a pivot at $v$, giving a motion similar to that of a parallel ruler used in drawing. The spring $w$ is coiled about the shaft at $v$, and a loop, $x$, passes over the lever $u$, thus giving the forward and curving motion at the same time.

Various other devices may be employed for this purpose, and we do not wish to confine ourselves in this particular; but What we do claim, and desire to secure by Letters Patent, is—

1. The longitudinally-moving rods D and E united at F, and so arranged as to have distinct motions, one in a curved and the other in a straight line, substantially as described.

2. The curved link J or an equivalent device for guiding the rod D and giving the curve, as described.

3. The adjusting device, consisting of the link J, with the transverse slot K and the holding-screw L, as described.

4. In combination with the rods D and E having different motions, as shown, the impelling-spring I or equivalent device, as described.

5. The bell-crank lever having the arms $o$ and $r$, as shown, and the swinging plate M, together with the notched rod E, as and for the purpose described.

In witness that the above-described invention is claimed by us we have hereunto set our hands and seals.

JOHN H. MOONEY. [L. S.]
G. A. LLOYD. [L. S.]

Witnesses:
WILLIAM MOODY,
W. D. BROMLEY.